United States Patent [19]

Kort et al.

[11] Patent Number: 5,423,570
[45] Date of Patent: Jun. 13, 1995

[54] HYBRID INFLATOR WITH TORTUOUS DELIVERY PASSAGE

[75] Inventors: Leland B. Kort, Lakewood, Colo.; Randall J. Clark, Pleasant View; Bradley W. Smith, Ogden, both of Utah

[73] Assignee: Morton International, Inc., Chicago, Ill.

[21] Appl. No.: 239,692

[22] Filed: May 9, 1994

[51] Int. Cl.[6] .............................................. B60R 21/26
[52] U.S. Cl. .................................... 280/736; 280/741; 102/530; 222/3
[58] Field of Search ............... 280/736, 737, 740, 741, 280/731; 102/530, 531; 222/3, 5

[56] References Cited

U.S. PATENT DOCUMENTS

| | | | |
|---|---|---|---|
| 3,618,981 | 11/1971 | Leising et al. | 280/740 |
| 4,830,401 | 5/1989 | Honda | 280/736 |
| 5,060,973 | 10/1991 | Giovanetti | 280/736 |
| 5,184,846 | 2/1993 | Goetz | 280/736 |
| 5,199,740 | 4/1993 | Frantom et al. | 280/736 |
| 5,226,668 | 7/1993 | Delonga-Imik et al. | 222/3 X |
| 5,360,232 | 1/1994 | Lowe et al. | 280/741 |
| 5,362,099 | 11/1994 | Föhl | 280/737 |

FOREIGN PATENT DOCUMENTS 2443267 3/1975 Germany .................. 280/741

*Primary Examiner*—Margaret A. Focarino
*Assistant Examiner*—Christopher Ellis
*Attorney, Agent, or Firm*—George W. Rauchfuss, Jr.; Gerald K. White

[57] ABSTRACT

A hybrid inflator for a vehicle passenger restraint system comprises a center tie having upper and lower ends, and a curved, continuous vessel wall secured to the upper and lower ends of and surrounding the center tie to define a pressure chamber storing inert compressed gas. The center tie defines a combustion chamber extending from the lower end thereof, the combustion chamber receiving pyrotechnic gaseous heat source material and a squib for igniting it. The center tie further defines a directional inlet port extending from the combustion chamber into the pressure chamber and a rupturable diaphragm seals the inlet port until ignition of the pyrotechnic generant. The center tie also defines a directional outlet vent extending from the pressure chamber adjacent the upper end of the center tie, the directional outlet vent being oriented substantially opposed the inlet port. The outlet vent is part of an outlet passage from the pressure chamber through the upper end of the center tie, including an orifice cavity and outlet orifice, oriented to provide further turns in the gas flow path. A rupturable diaphragm seals the outlet passage until ignition of the gas generant. A diffuser provides an additional change of direction of the outlet path.

18 Claims, 2 Drawing Sheets 5,423,570

HYBRID INFLATOR WITH TORTUOUS DELIVERY PASSAGE

FIELD OF INVENTION

The invention herein relates to a hybrid inflator for vehicle passenger restraint systems and more particularly to a hybrid inflator with a tortuous gas delivery passage which minimizes the possibility of hot products of combustion and related debris entering the airbag and enhances heat transfer to and expansion of compressed gas.

BACKGROUND OF THE INVENTION

Vehicle passenger restraint systems utilize an airbag which must be inflated quickly in the event of a vehicle crash to provide restraint and cushioning for the occupant. A hybrid inflator can be provided to fill the airbag, the hybrid inflator utilizing a combination of compressed inert gas and the products of combustion of a pyrotechnic heat source. Hybrid inflators are desirable because they generally do not require the use of azides and are hence environmentally-friendly, and the inflation gasses delivered to the airbags are cooler than those from pyrotechnic gas generators, therefore permitting more latitude in the design of associated structures.

However, the use of any pyrotechnic material in the production of inflation gasses creates the possibility of introducing hot products of combustion and associated hot debris from the inflator into the airbag. Although filters may be used to reduce this possibility, the filters add cost, weight, and bulk to the structure and can restrict gas delivery.

SUMMARY OF INVENTION

It is a principal object of the invention herein to provide a hybrid inflator for a vehicle occupant restraint system.

It is an additional object of the invention herein to provide a hybrid inflator which minimizes delivery of hot products of combustion and debris from the inflator to an associated airbag.

It is a further object of the invention herein to provide a hybrid inflator which achieves a controlled flow of inflation gasses to an airbag.

According to the invention herein, a hybrid inflator for a vehicle passenger restraint system comprises a center tie having an upper end and a lower end, and a curved, continuous vessel wall secured to the upper and lower ends and surrounding the center tie to define a pressure chamber receiving and storing a compressed gas. According to one aspect of the invention, the vessel wall and the center tie together form a generally toroidal pressure chamber containing an inert gas, such as argon or nitrogen, stored at a pressure of between 2,000 to 4,000 psi. The center tie defines a combustion chamber receiving and storing a pyrotechnic heat source material. The center tie also mounts initiator means for igniting the pyrotechnic heat source material. The center tie further defines a directional inlet port extending from the combustion chamber into the pressure chamber and means sealing the inlet port. The inlet port provides delivery of hot gasses from the pyrotechnic heat source material to a limited arcuate portion of the pressure chamber, after which the hot gasses turn and follow paths flanking the center tie, mixing with the inert gas in the pressure chamber.

According to additional aspects of the invention, the combustion chamber extends axially inwardly from the lower end of the center tie, the pyrotechnic heat source material is boron potassium nitrate (BKNO$_3$), the initiator is mounted on a closure of the combustion chamber and includes an electrically operating squib for igniting the pyrotechnic heat source material, and the directional inlet port is sealed by a rupturable metal disk. Upon ignition, the pyrotechnic heat source material burns and produces hot gasses which rupture the metal disk, permitting the hot gasses to enter the pressure chamber directionally through the inlet port and heat and expand the gasses therein.

The center tie further defines a directional outlet vent extending from the pressure chamber adjacent the upper end of the center tie, the orientation of the directional inlet port and the directional outlet vent being substantially opposed. The outlet vent comprises an outlet passage from the pressure chamber through the upper end of the center tie, and the inflator further comprises rupturable means sealing the outlet passage. The expanding stored gas and hot combustion gasses rupture the sealing means, permitting gas to exit the pressure chamber and center tie. Thus, the path from the combustion chamber to the outlet passage begins and ends in substantially opposed directions, and this tortuous path decreases the amount of solid products of combustion and debris which exits through the outlet vent.

According to other aspects of the invention, the outlet passage further comprises an orifice cavity defined by the center tie for receiving gasses from the outlet vent, and a defined outlet orifice opening axially upwardly from the top of the center tie. The outlet orifice controls the flow of gas from the inflator. According to additional aspects of the invention, a diffuser is provided atop the center tie to receive and distribute inflation gas, the diffuser including a solid top plate juxtaposed the outlet orifice and a sidewall with radially directed exit openings. Thus, the outlet cavity and diffuser provide two additional 90 degree changes of direction in the tortuous path of inflation gasses delivered to an airbag. The airbag is mounted surrounding the diffuser, for inflation by the gasses.

The various features of novelty which characterize the invention are pointed out with particularity in the claims annexed to and forming a part of this specification. For a better understanding of the invention, its operating advantages, and specific objects attained by its use, reference is made to the accompanying drawings and description of the preferred embodiment, which follow.

DRAWINGS

FIG. 31 is a fragmented view of the upper end of the center tie and the diffuser of the hybrid inflator of FIG. 1.

The same reference numerals refer to the same elements throughout the various figures.

DESCRIPTION OF PREFERRED EMBODIMENT

Figures 1, 2:
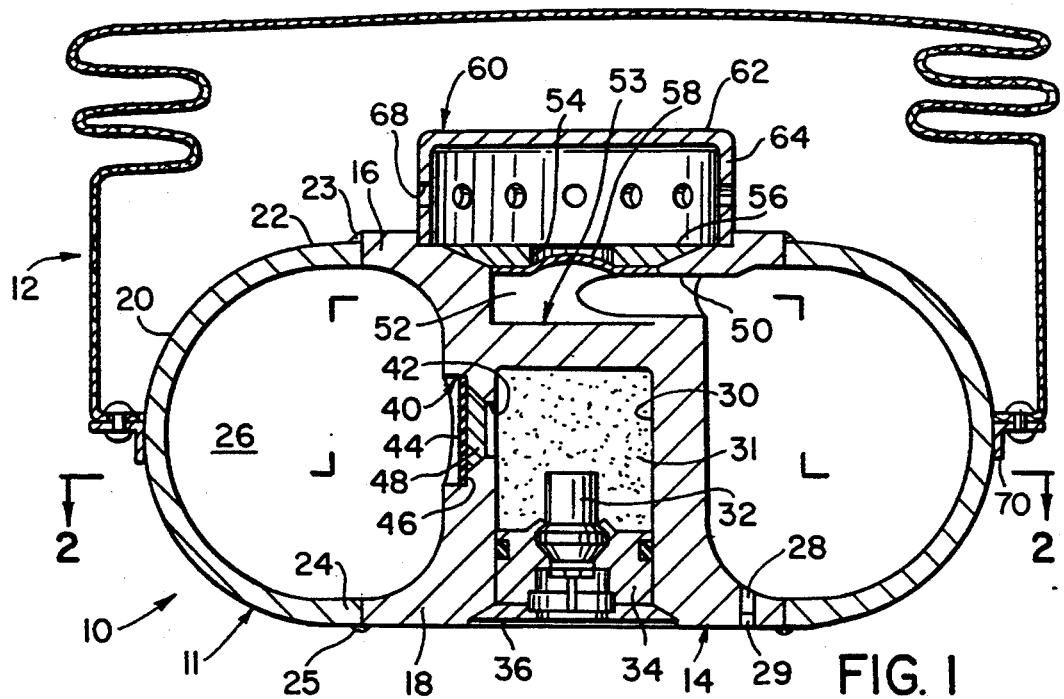
FIG. 1 is a vertical sectional view of a hybrid inflator according to the invention herein.
FIG. 2 is a horizontal sectional view of the hybrid inflator of FIG. 1, taken along the lines 2—2 of FIG. 1.
Figure 3:
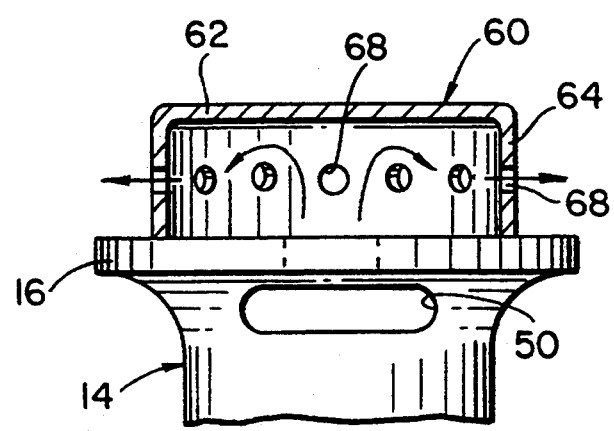

A hybrid inflator 10 according to the invention herein is illustrated in FIGS. 1 and 2, and is shown fragmentally in FIG. 3. With reference to FIG. 1, the hybrid inflator 10 has an airbag 12 mounted thereto for inflation. The airbag 12 is shown schematically, and in practice would be larger, folded compactly and packed closely adjacent the inflator 10 prior to use, as is well known in the art.

The hybrid inflator 10 comprises a housing 11 having a generally cylindrical center tie 14 having a radially extending circular flange 16 at its upper end and a radially extending circular flange 18 at its lower end. A curved continuous vessel wall 20 has a generally C-shaped cross section with an upper circular marginal edge portion 22 which is secured to the upper end flange 16 of the center tie by weld 23, and a lower circular edge portion 24 which is secured to the lower end flange 18 of the center tie by weld 25, whereby the vessel wall 20 and center tie 14 together define a toroidal pressure chamber 26 surrounding the center tie. The pressure chamber 26 is filled with an inert gas, such as argon or nitrogen, at pressure in the range of 2,000 to 4,000 psi., and the gas is sealed in the chamber 26 by sealing means, described below, until operation of the hybrid inflator 10. The gas is introduced through a fill port 28, which is then welded shut at 29.

The center tie 14 defines a combustion chamber 30 which extends axially inwardly from the lower end of the center tie. The combustion chamber 30 contains a pyrotechnic heat source material 31 generally comprised of boron potassium nitrate ($BKNO_3$) or other suitable pyrotechnic which produces hot gasses used to heat the stored gas. The combustion chamber 30 and pyrotechnic heat source material contained therein is further provided with an initiator squib 32 mounted in a cylindrical plug 34 which seals the combustion chamber 30 at the lower end of the center tie. The plug 34 and the squib 32 are secured in position by a beveled plate 36 which is welded to the center tie 14.

The center tie 14 defines a directional inlet port 40, including circular inlet orifice 42 extending from the combustion chamber 30 into the gas chamber 26. The inlet port 40 is directional in that it extends radially along line 41 through the center tie toward a limited arcuate portion of the gas chamber and vessel wall, generally indicated as Zone A in FIG. 2, and does not initially direct hot combustion gasses exiting from the combustion chamber 30 evenly throughout the gas chamber 26. The diameter of the inlet port 40 is less than one-sixth the circumference of the center tie 14. Prior to operation of the hybrid inflator 10, the pressure chamber 26 is sealed from the pyrotechnic combustion chamber by a thin metal diaphragm 44 welded about its perimeter to a stepped portion 46 of the inlet port 40. The diaphragm 44 is backed by a solid plug 48 received in a chamfered seat adjacent the inlet orifice 42 of the inlet port 40, thereby providing support against the gas pressure for the thin diaphragm 44.

The center tie 14 further defines a directional outlet vent 50 at the upper end thereof, directional outlet vent 50 having an orientation along line 51 which is aligned with the line 41 of the directional inlet port 40. The opening to the outlet vent 50 is diametrically opposed the outlet of the directional inlet port 40, i.e., it faces a limited arcuate portion of the pressure chamber diametrically opposite the inlet port 40, as generally indicated as Zone B in FIG. 2. The directional outlet vent 50 comprises a portion of an outlet passage 53, further including an orifice cavity 52 and an outlet orifice 54. The outlet orifice 54 is defined by a beveled plate 56 which is welded to a mating recess in the upper end of the center tie 14, partially defining the orifice cavity 52, and the outlet orifice 54 is covered by a rupturable metal diaphragm 58 which has its periphery welded to the underside of the beveled plate 56 surrounding the outlet orifice 54. As shown in FIG. 1, the metal diaphragm 58 tends to bow upwardly under the pressure of the stored compressed gas.

The outlet vent 50 is preferably rectangular or slot-like, having parallel walls and being of constant cross section along its length. The cross sectional area of the outlet vent 50 is larger than the cross sectional area of the outlet orifice 54, wherein the outlet orifice 54 controls the rate of supply of inflation gas to the airbag 12.

The hybrid inflator 10 further comprises a diffuser 60 which has an inverted cup shape including a top wall 62 and cylindrical sidewall 64. The top wall 62 is juxtaposed the outlet orifice 54, such that gas flowing from the outlet orifice is directed toward the top wall. The lower marginal edge of the sidewall is received and secured in a mating recess in the upper end of the center tie 14, as best seen in FIG. 1. The sidewall 64 of the diffuser 60 is provided with a plurality of evenly spaced apart diffuser exit openings 68.

The hybrid inflator 10 is utilized to inflate the airbag 12, and the mouth of the airbag is shown secured to the hybrid inflator 10 at a peripheral flange 70 mounted to the vessel wall 20. Thus, inflation gasses exiting the hybrid inflator 10 at the diffuser openings 68 enter the interior of the airbag 12 for inflating it.

The hybrid inflator 10 functions in the following manner. In response to a signal indicative of a vehicle crash, a control signal is communicated to the initiator squib 32, which is activated. Upon activation, the initiator squib 32 fires, igniting the pyrotechnic heat source 31. As pressure in the pyrotechnic combustion chamber 30 rises and exceeds the gas storage pressure, the plug 48 is unseated. Subsequently, the thin metal diaphragm 44 ruptures when the combustion pressure exceeds the gas storage pressure and the strength of the diaphragm. Hot gas and hot particles from the burning pyrotechnic heat source and initiator squib flow through the directional inlet port 40, generally along line 41, into a limited arcuate portion of the pressure chamber 26.

The hot gas and hot particles from the burning pyrotechnic heat the stored gas, causing a rapid pressure rise in the chamber 26. When the pressure in chamber 26 exceeds the structural capability of the metal diaphragm 58 covering the outlet orifice 54, the metal diaphragm ruptures, allowing the gas to exit through the diffuser orifices 68 into the airbag 12. The major volume of stored gas is in the toroidal chamber 26, and it is augmented by the gas from the burning pyrotechnic heat source material 31. Thus, after the initial volume of gas in the orifice cavity 52 is delivered, the flow of inflation gas is through the outlet vent 50, orifice cavity 52 and outlet orifice 54. As noted above, the outlet orifice 54 throttles the flow of gas from the inflator and provides a desired fill rate into the airbag, which can be adjusted as desired for particular airbag structures by varying the diameter of the orifice.

The flow path from combustion chamber 30 to the diffuser outlet openings 68 is tortuous and thereby prevents or substantially minimizes hot particles entering the airbag 12. In particular, hot particles and debris from the combustion chamber 30 are first directed along the exit line 41 of the inlet port 40 to the pressure chamber 26. The flow of heated gas is then around the pressure chamber 26, flanking the center tie as indicated by arrows 72 in FIG. 2. The outlet path next turns radially inwardly as shown by arrows 74 in FIG. 2 to enter the outlet vent 50. This path between diametrically opposed openings also promotes heat exchange from the hot pyrotechnic gasses to the stored gas, thereby heating and expanding the stored gas.

The direction of flow changes by 90 degrees within the orifice cavity 52, with the outlet flow being generally axial with respect to the center tie 14, as best seen in FIG. 3. The outlet flow then impinges on the top wall 62 of the diffuser 60 and next turns another 90 degrees to exit the diffuser openings 68. Because the gasses weigh less than particles and debris which develop from operation of the squib, burning the pyrotechnic heat source material and rupturing the diaphragm 44, the particles and debris substantially do not achieve all of the directional changes in the path from the combustion chamber to the outlets of the diffuser openings 68, preventing or greatly minimizing expulsion of hot particles to the interior of the airbag 12. A filter screen may be provided within the diffuser, if desired and as known in the art; however, only a lightweight diffuser screen is required, if at all.

Accordingly, the preferred embodiment of the hybrid inflator has been described which admirably achieves the objects of the invention herein. With reference to the description of the preferred embodiment, those skilled in the art will appreciate that modifications may be made without departing from the spirit of the invention. Therefore, it is not intended that the scope of the invention be limited to the specific embodiment illustrated and described. Rather, it is intended that the scope of the invention be determined by the appended claims and equivalents thereof.

We claim:

1. A hybrid inflator for a vehicle passenger restraint system, comprising:
    A) a center tie having an upper and lower end;
    B) a curved, continuous vessel wall secured to the upper and lower ends of and surrounding the center tie to define a gas chamber receiving and storing a compressed gas;
    C) the center tie defining a combustion chamber extending from the lower end thereof, the combustion chamber receiving and storing pyrotechnic gaseous heat source material and initiator means for igniting the pyrotechnic material;
    D) the center tie further defining a directional inlet port extending only in a single direction from the combustion chamber into the gas chamber and means sealing the inlet port until at least ignition of the pyrotechnic material;
    E) the center tie further defining a directional outlet vent extending only in a single direction from the gas chamber adjacent the upper end of the center tie, the orientation of the directional inlet port and the directional outlet vent being substantially opposed; and
    F) the outlet vent forming at least a portion of an outlet passage from the gas chamber through the upper end of the center tie and means sealing the outlet passage until after ignition of the pyrotechnic material;
wherein ignition of the pyrotechnic gaseous heat source material causes subsequent release of both sealing means, permitting hot gas from the combustion chamber to enter the gas chamber through the directional inlet port, mix with the pressurized gas while flowing through opposed generally c-shaped paths surrounding the center tie and exit with the pressurized gas through the directionally opposed outlet vent.

2. A hybrid inflator for a vehicle passenger restraint system as defined in claim 1 wherein the center tie is generally cylindrical and the inlet port delivers hot gas from the combustion chamber through a limited arcuate portion of the center tie.

3. A hybrid inflator as defined in claim 2 wherein the inlet port includes an inlet orifice which delivers hot gas through the limited arcuate portion of the center tie.

4. A hybrid inflator as defined in claim 3 wherein the means sealing the inlet port is a rupturable metal diaphragm.

5. A hybrid inflator for a vehicle passenger restraint system as defined in claim 3 wherein the outlet vent receives gas from the gas chamber through a limited arcuate portion of the center tie diametrically opposed to the inlet port.

6. A hybrid inflator for a vehicle passenger restraint system as defined in claim 2 wherein the outlet vent receives gas from the gas chamber through a limited arcuate portion of the center tie diametrically opposed to the inlet port.

7. A hybrid inflator as defined in claim 1 wherein the outlet passage further comprises an orifice cavity defined in the upper end of the center tie and connected to the gas chamber by the outlet vent, and an outlet orifice from the orifice cavity.

8. A hybrid inflator as defined in claim 7 wherein the portion of the outlet passage from the outlet vent to the outlet orifice turns substantially 90 degrees in the orifice cavity.

9. A hybrid inflator as defined in claim 8 wherein the outlet orifice has a smaller cross sectional area than the outlet vent and the outlet orifice thereby controls the flow of inflation gasses from the hybrid inflator.

10. A hybrid inflator as defined in claim 8 and further comprising a diffuser positioned over the outlet orifice, the diffuser including a top wall positioned juxtaposed the outlet orifice for turning the path of the outlet gasses substantially 90 degrees, and a peripheral sidewall including a plurality of spaced-apart orifices for delivering the inflation gasses to an airbag.

11. A hybrid inflator as defined in claim 7 wherein the outlet orifice has a smaller cross sectional area than the outlet vent and the outlet orifice thereby controls the flow of inflation gasses from the hybrid inflator.

12. A hybrid inflator as defined in claim 7 wherein the means sealing the outlet passage comprises a rupturable metal diaphragm covering over the outlet orifice.

13. A hybrid inflator as defined in claim 1 and further comprising a diffuser positioned over the outlet orifice, the diffuser including a top wall positioned juxtaposed the outlet orifice for turning the path of the outlet gasses substantially 90 degrees, and a peripheral sidewall including a plurality of spaced-apart orifices for delivering the inflation gasses to an airbag.

14. A hybrid inflator as defined in claim 1 wherein the gas generant is boron potassium nitrate ($BKNO_3$) and the gas chamber contains an inert gas pressurized in the range of 2,000–4,000 pounds per square inch.

15. A hybrid inflator for a vehicle passenger restraint system, comprising:
    A) a housing defining a pressure chamber, the housing including a center tie extending through the pressure chamber;

B) inert gas pressurized to between 2,000 and 4,000 pounds per square inch within the pressure chamber;

C) a combustion chamber defined within the center tie, the center tie defining an inlet port extending only in a single direction from the combustion chamber to the pressure chamber, the inlet port being directionally oriented toward a first limited portion of the pressure chamber;

D) pyrotechnic heat source material contained within the combustion chamber and means for igniting the pyrotechnic heat source material;

E) means sealing the inlet port, the inlet port sealing means adapted to open the inlet port in response to ignition of the pyrotechnic heat source material;

F) an outlet passage extending only in a single direction defined by the housing and connecting the pressure chamber with an airbag mounted to the housing, the outlet passage including at least an outlet vent directionally oriented toward a second limited portion of the pressure chamber substantially opposed from the first limited portion; and G) means sealing the outlet passage, the outlet passage sealing means adapted to open after ignition of the pyrotechnic heat source material;

wherein hot gasses from the ignited pyrotechnic heat source enter the first limited portion of the pressure chamber, mixing with and heating the compressed gas and changing direction while traveling through opposed generally c-shaped paths flanking the center tie to the second limited portion of the pressure chamber and the opposed outlet passage.

16. A hybrid inflator as defined in claim 15 wherein the outlet passage includes at least one change of direction of at least 90°.

17. A hybrid inflator for a vehicle passenger restraint system, comprising

A) a generally cylindrical center tie having a radially extending circular top flange and a radially extending circular bottom flange;

B) an annular vessel wall having a C-shaped cross-section with upper and lower circular edges, the upper edge being secured to the circular top flange of the center tie and the lower edge being secured to the circular bottom flange of the center tie, the vessel wall and center tie together defining a toroidal pressure chamber;

C) inert pressurized gas contained within the toroidal pressure chamber;

D) a combustion chamber defined by and extending into the center tie from the lower end thereof, the combustion chamber containing pyrotechnic heat source material and a plug closing the combustion chamber, the plug mounting an initiator squib for igniting the pyrotechnic heat source material;

E) a substantially circular inlet port formed through the center tie extending only in a single direction from the combustion chamber to the pressure chamber, the inlet port having a diameter no greater than one-sixth of the circumference of the center tie, such that the inlet port is directional oriented with respect to the pressure chamber;

F) a metal diaphragm sealing the inlet port, and rupturable after ignition of the pyrotechnic heat source material;

G) an outlet passage defined in the center tie above the combustion chamber and extending only in a single direction including
  i) an outlet vent from the pressure chamber, the outlet vent oppositely directionally oriented from the inlet port with respect to the pressure chamber;
  ii) an orifice cavity connected to the pressure chamber by the outlet port;
  iii) an outlet orifice defined as the exit from the orifice cavity and oriented to provide a turn in the outlet passage; and H) a metal diaphragm sealing the outlet passage, and rupturable by increased pressure in the gas chamber after ignition of the pyrotechnic heat source material where upon activation of the inflator, a heated compressed gas will flow from the inlet port through opposed generally c-shaped paths flanking the center tie and to the outlet passage.

18. A hybrid inflator as defined in claim 17 and further comprising a diffuser mounted to the center tie, the diffuser including a top wall juxtaposed the outlet orifice and a sidewall surrounding the outlet orifice, the sidewall defining a plurality of spaced-apart outlet openings.

* * * * *